March 16, 1937.  L. C. STUKENBORG  2,073,660
HEAD FOR COTTON PICKERS
Filed Oct. 21, 1935
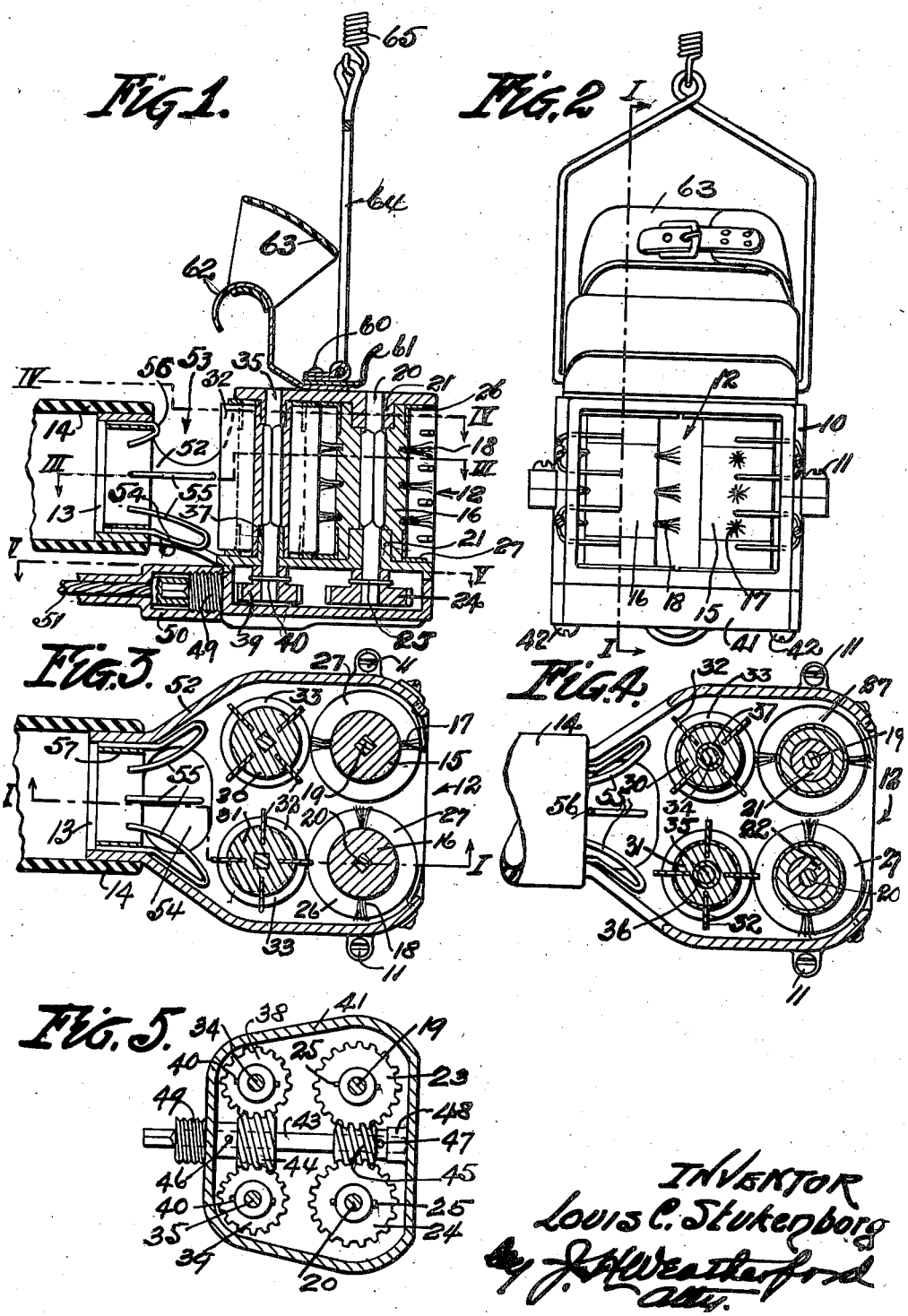
INVENTOR
Louis C. Stukenborg Patented Mar. 16, 1937

2,073,660

UNITED STATES PATENT OFFICE 2,073,660

HEAD FOR COTTON PICKERS

Louis C. Stukenborg, Memphis, Tenn.

Application October 21, 1935, Serial No. 45,868

8 Claims. (Cl. 56—32)

This invention relates to improvements in picker heads for cotton pickers of the general type shown in my prior United States Letters Patents No. 1,131,804 dated March 16, 1915 and No. 1,264,575 dated April 30, 1918.

The present invention relates to the means for picking or removing the cotton from the bolls and has particular reference to the construction of such heads whereby the cotton is efficiently delivered to the suction hose or transferred to a suitable receptacle, and whereby bolls which have been drawn in with such cotton are trapped and their removal from the head facilitated.

In picking cotton with devices of this kind the cotton is withdrawn from the boll by suitable brushes, to which brushes it adheres and from which it must be stripped if operation is to continue. The present device contemplates an efficient means for the stripping of such cotton from the brushes and its delivery away from the mouth of the head in position to be picked up by a current of air. Also in picking cotton particularly where the bolls and stems have become quite dry there is a tendency for an occasional boll to be broken off and if not rejected by the mouth of the head, to pass with the cotton into the air current and to be thereby delivered into the receptacle, such bolls usually being so brittle that they easily break up either in delivery to the receptacle or thereafter in ginning.

The present device contemplates means for stopping such bolls within the head itself and the provision of means by which access may be had to such bolls for the purpose of their manual removal. It will be understood that the entrance of the bolls into the head is ordinarily so infrequent that the delay on account of their removal is not of a consequence in any way commensurate with the deleterious effect of their presence in the picked cotton.

The objects of the invention are:

To provide means for preventing cotton getting to the bearings of the picking brushes;

To provide stripping means by which the cotton is removed from the picking brushes and transferred to the conveying air current;

To provide means for stopping the passage of bolls which have entered the picking head with the cotton, and to provide access to such stopping means whereby manual removal of the bolls trapped in the head is facilitated.

The means by which the foregoing and other objects are accomplished, and the manner of their accomplishment will be fully understood from the following specification on reference to the accompanying drawing, in which,—

Fig. 1 is a longitudinal sectional elevation taken on the line I—I of Figs. 2 and 3.

Fig. 2 is a front elevation of the head.

Fig. 3 is a sectional plan taken on the line III—III of Fig. 1.

Fig. 4 is a sectional plan taken on the line IV—IV of Fig. 1, and

Fig. 5 a sectional plan taken on the line V—V of Fig. 1.

Referring now to the drawing in which the various parts are indicated by numerals, the head comprises a casing 10 preferably made up of upper and lower halves, secured together as by screws 11, this head having its forward end 12 open and having at its rear end an annular extension 13 of reduced size which is adapted to be secured as by frictional engagement in an air hose 14 which leads to a suitable suction fan (not shown). Adjacent the open forward end of the head are cylindrical brushes 15, 16 which are spaced apart sufficiently to permit the passage of locks of cotton withdrawn from the cotton boll by the bristles 17, 18 of the brushes. The brushes are mounted on shafts 19, 20 respectively which are journaled in suitable bearings 21, 22, respectively, the brushes being constrained to turn with the shafts as by a squared central portion. Gears 23 and 24 are also secured on the shafts 19, 20 as by pins 25. The ends of the brushes 15, 16 are countersunk to receive bearings 21 and 22, so that these bearings extend well within the end portions of the brushes and are housed thereby. Also these brushes are provided at their ends with outwardly extending radial flanges 26, 27 which flanges are relatively quite thin and closely contact the casing walls radially outward from the bearings 21, 22, this being done in order that cotton which is drawn in by the brushes will, insofar as it is possible, be prevented from entrance to and clogging up of the bearing surfaces of the shafts 19, 20.

Cooperating with the brushes 15, 16 is a pair of strippers 30, 31 one for each brush, which strippers have blades 32, preferably of resilient material such as sheet rubber. These strippers are provided at their ends with radial flanges 33, which closely contact the casing walls, are carried by shafts 34, 35 and are constrained to move with the shaft as by the squared shaft portions. The shafts 34, 35 are journaled in bearings 36, 37 which extend into recesses in the ends of the strippers. The shafts 34, 35 extend beyond the casing 10 and have mounted on their extending ends, gears 38, 39 which are secured thereto as by pins 40. The gears 38, 39 are preferably of equal size as also are the gears 23, 24. Both sets of gears are enclosed in a gear housing 41 which is secured to the head 10 as by screws 42. Disposed within the housing is a shaft 43 to which worms 44, 45 are secured as by pins 46, 47, this shaft being suitably journaled in bearings 48, 49 and extending through the bearing 49 for driving engagement, through a coupling 50, with a flexible driving shaft 51 which may be driven in any desired manner as by an electric motor (not shown). The gears 38, 39 are smaller than the gears 23, 24, the worm 44 which meshes with the first of these gears being correspondingly larger than the worm 45 meshing with the larger gears and the relation of diameters and pitch being such that the smaller gears 38, 39 and the strippers carried thereby, are rotated at least twice as fast as the gears 23, 24 and the brushes driven thereby.

Immediately rearwardly of the strippers 30, 31, the casing 10 has a converging neck 52 which joins it to the annular extension 13. The upper portion of this neck is cut away at 53 to provide access to the interior of the neck and a liberal air opening. An additional air entrance 54 preferably is also provided in the lower portion of the neck. Mounted within the extension 13 and the neck 52 is a group of resilient fingers 55 which converge rearwardly, an upper finger 56 preferably being much shortened in order not to interfere with access through the opening 53 to the group of fingers. The fingers 55 and the finger 56 are preferably secured as by brazing or soldering to a collar 57, the assembly being slipped within the extension 13 and frictionally engaged therewith such construction providing a limited amount of adjustment of the position of the fingers. Mounted on the upper portion of the head and secured thereto as by screws 60 is a grip member comprising a finger grip portion 61 and a heel portion 62 adapted to rest against the palm of the hand. 63 is a flexible strap adapted to engage over the back of the hand. 64 is a hanger by which the head is supported from a suitable arm or member (not shown), 65 being a spring interposed between such arm and the hanger.

In using the picker head, the operator's hand is slipped through the flexible strap 63, with the heel of the palm of the hand resting against the heel portion 62, and the fingers engaging the finger grip. A vacuum current is set up through the hose 14 and the shaft 43 is rotated to turn the strippers and picking brushes. The mouth of the head is brought into proximity with the cotton boll permitting the brushes to engage the lint and withdraw the locks of the cotton from the bolls. These locks are brushed off by the rapidly revolving strippers and are thrown mechanically backward into the mouth of the air hose. Air entering the hose through the openings 53 and 54 picks up the cotton and transfers it through the housing to a suitable receptacle. It will be particularly noted that the speed of the strippers is ordinarily at least twice and possibly even more times, as great as the speed of the brushes, so that the cotton is effectually cleaned from the brushes and that the air entrances 53, 54 are of such size and so positioned with regard to the hose, that substantially all the air necessary enters through these openings rather than through the mouth of the head, this being important in that it minimizes the amount of dry leaves and other trash which would be sucked in through the mouth of the head were it necessary for the air to enter at such place, or even a major portion of the air to so enter.

Should a boll be broken off as the cotton locks are being stripped therefrom, it will ordinarily be checked at the mouth of the head and as the cotton is withdrawn, will drop away without causing trouble. Occasionally however, a boll will get past the mouth and into the head. In such case, it will be stopped by the group of resilient fingers 55, 56 and be prevented from entering the air hose. In such case also the boll may ordinarily be shaken out by merely inverting the picker head or should this not be true, it may be removed manually by the fingers of the other hand reaching in through the air openings 53, such removal ordinarily being accomplished at the same time the head is being shifted from one boll to the next, or in any event, with a very minor delay in such shifting.

It will also be noted that the projecting flanges 26, 27 of the brushes and 33 of the strippers materially aid, and as a matter of fact substantially prevent, lint getting to the shafts and wrapping therearound.

It will further be noted that the strippers are provided with blades as distinguished from fingers or fibrous brushes, in order that entanglement of the fibrous lint of the cotton with the strippers will be avoided, and that these blades preferably extend lengthwise of the strippers well beyond, that is in the present instance, above and below, the zone of the bristles of the brushes, thereby further getting away from entanglement with the fibre or lint which is being stripped from the brushes. Preferably also the blades are made of pliable resilient material, such as rubber and actually extend into contact with the flanges of the brushes so that not only do the strippers act to clear the bristles of the brushes, but they also act to strip the lint lying against the flanges and thereby to additionally prevent the lint from getting between the flanges and the casing, and subsequently wrapping around the brush shaft.

What I claim is:

1. In a cotton picker, a picker head having an open mouth, picker brushes at said mouth, strippers mounted rearwardly of said brushes, guards extending partially across said mouth in front of said brushes, and a group of resilient fingers converging rearwardly, disposed within said head and rearwardly of said strippers, said head being apertured in proximity to said group of fingers whereby to permit access thereto for removal of bolls trapped by said fingers.

2. In a cotton picker, a picker head having an open mouth, picker brushes at said mouth, strippers mounted rearwardly of said brushes, and a group of fingers converging rearwardly disposed within said head and rearwardly of said strippers, said head being apertured in proximity to said group of fingers whereby to permit access thereto for removal of bolls trapped by said fingers.

3. In a cotton picker, a picker head having an open mouth, picker means at the forward end of said head, and a group of fingers converging rearwardly disposed within said head and rearwardly of said picker means, said head being apertured in proximity to said group of fingers whereby to permit access thereto for removal of bolls trapped by said fingers.

4. In a cotton picker, a casing having a pair of cooperative brushes journaled adjacent its forward end, said end having an entrance opening thereinto, a pair of strippers journaled rearwardly of and in proximity to said brushes, said strippers having resilient blades, means for rotating said brushes and means for rotating said strippers at a greater rate of speed than said brushes.

5. In a cotton picker, a casing having a pair of cooperative brushes journaled adjacent its forward end, said end having an entrance opening thereinto, a pair of strippers journaled rearwardly of and in proximity to said brushes, said strippers having blades, means for rotating said brushes and means for rotating said strippers at a greater rate of speed than said brushes.

6. In a cotton picker, a casing having a pair of cooperative brushes journaled adjacent its forward end, said end having an entrance opening thereinto, a pair of strippers journaled rearwardly of and in proximity to said brushes, said strippers having resilient blades, means for rotating said brushes and means for rotating said strippers.

7. In a cotton picker, a casing having a pair of cooperative brushes journaled adjacent its forward end, said end having an entrance opening thereinto, a pair of strippers journaled rearwardly of and in proximity to said brushes, said strippers having blades, and means for rotating said brushes and said strippers.

8. In a cotton picker, a casing having a pair of cooperative brushes journaled adjacent its forward end, said end having an entrance opening thereinto, a pair of strippers journaled rearwardly of and in proximity to said brushes, the axes of said strippers being substantially parallel to the axes of said brushes, and means for rotating said brushes and said strippers.

LOUIS C. STUKENBORG.